United States Patent
Zhang

(10) Patent No.: US 9,665,247 B2
(45) Date of Patent: May 30, 2017

(54) METHOD AND DEVICE FOR APPLYING A NEW SKIN TO A DISPLAY ENVIRONMENT

(71) Applicant: Tencent Technology (Shenzhen) Company Limited, Shenzhen (CN)

(72) Inventor: Chonghua Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 347 days.

(21) Appl. No.: 14/265,271

(22) Filed: Apr. 29, 2014

(65) Prior Publication Data

US 2014/0258895 A1    Sep. 11, 2014

Related U.S. Application Data

(63) Continuation of application No. PCT/CN2013/088021, filed on Nov. 28, 2013.

(30) Foreign Application Priority Data

Dec. 27, 2012  (CN) .......................... 2012 1 0578691

(51) Int. Cl.
  *G06F 9/44* (2006.01)
  *G06F 3/0484* (2013.01)
  *G09G 5/02* (2006.01)

(52) U.S. Cl.
  CPC .......... *G06F 3/0484* (2013.01); *G06F 9/4443* (2013.01); *G09G 5/02* (2013.01); *G09G 2340/14* (2013.01)

(58) Field of Classification Search
  None
  See application file for complete search history.

(56) References Cited

U.S. PATENT DOCUMENTS 5,555,093 A     9/1996  Nagashima
8,433,302 B2 *  4/2013  Hunter .............. H04M 1/72544
                                                455/39

(Continued)

FOREIGN PATENT DOCUMENTS

CN       1637843 A    7/2005
CN     101309377 A   11/2008
CN     102768625 A   11/2012

OTHER PUBLICATIONS

Tencent Technology, ISRWO, PCT/CN2013/088021, Mar. 6, 2014, 6 pgs.

(Continued)

*Primary Examiner* — Jennifer To
*Assistant Examiner* — Beau Spratt
(74) *Attorney, Agent, or Firm* — Morgan, Lewis & Bockius LLP

(57) ABSTRACT

Method, system, and computer-readable medium for applying a new skin to a display environment are disclosed. In one aspect, at a device having one or more processors, memory, and a display: user input for switching to a new skin for a display environment on the device is received, the new skin being of a gradient color type; in response to the user input, a skin changing request is sent to a server, wherein the skin changing request identifies the new skin and the type of the new skin; the new skin is received from the server in an abstracted form, the abstracted form comprising one or more gradient color ranges in lieu of an image of the new skin; and a displayed region of the new skin is generated based on the one or more gradient color ranges.

17 Claims, 4 Drawing Sheets

(56) References Cited

U.S. PATENT DOCUMENTS

| | | | | |
|---|---|---|---|---|
| 9,207,754 B2* | 12/2015 | Bennett | ............... | G06F 3/01 |
| 2008/0216015 A1* | 9/2008 | Lee | ............... | H04M 1/72544 |
| | | | | 715/810 |
| 2009/0288023 A1* | 11/2009 | Hernandez | ............ | G06F 9/4443 |
| | | | | 715/762 |
| 2010/0082661 A1* | 4/2010 | Beaudreau | ........ | G06F 17/30867 |
| | | | | 707/769 |
| 2011/0185040 A1* | 7/2011 | Schmidt | ............ | G06F 17/30905 |
| | | | | 709/217 |
| 2013/0044123 A1* | 2/2013 | Shah | ............ | G06F 8/38 |
| | | | | 345/594 |
| 2013/0207994 A1* | 8/2013 | Rodeski | ............ | G06F 17/30899 |
| | | | | 345/594 |
| 2014/0092115 A1* | 4/2014 | Mazzola | ................ | G09G 5/37 |
| | | | | 345/589 |

OTHER PUBLICATIONS

Tencent Technology, IPRP, PCT/CN2013/088021, Jun. 30, 2015, 5 pgs.

* cited by examiner

METHOD AND DEVICE FOR APPLYING A NEW SKIN TO A DISPLAY ENVIRONMENT

RELATED APPLICATIONS

This application is a continuation application of PCT Patent Application No. PCT/CN2013/088021, entitled "METHOD AND DEVICE FOR PROCESSING IMAGE DATA" filed Nov. 28, 2013, which claims priority to Chinese Patent Application Serial No. 201210578691.4, entitled "Method and Device for Processing Image Data", filed Dec. 27, 2012, the entirety of both of which is incorporated herein by reference.

FIELD OF THE INVENTION

The present application relates to the communication technical field, especially relates to a method and device for processing image data.

BACKGROUND OF THE INVENTION

In many of the current mobile phone applications, the user interface display effect is provided with a skin changing function to allow users to select various visual effects for the user interface.

In the conventional technology, display of a user interface element, especially the display of image elements generally adopts the method of loading an image source from the locally stored skin pack, and drawing the image on the screen with script or plug-in controls.

However, in the conventional technology, when the image drawing requires more sources, some of the big background pictures with simple gradient color will increase the size of document pack in general, which will increase the loading burden of the users of mobile phone, influencing the speed of loading sources of the program, and increasing the memory consumption consequently.

SUMMARY

In order to address the problems in the prior art, the embodiments of the present application provide a method and device for applying a gradient color skin to a display environment with reduced burden on the network transmission and computing resources.

In one aspect, the method for applying a new skin to a display environment includes: at a device having one or more processors, memory, and a display: receiving user input for switching to a new skin for the display environment on the device, the new skin being of a gradient color type; in response to the user input, sending a skin changing request to a server, the skin changing request identifying the new skin and the type of the new skin; receiving the new skin from the server in an abstracted form, the abstracted form comprising one or more gradient color ranges in lieu of an image of the new skin; and generating a displayed region of the new skin based on the one or more gradient color ranges.

In some embodiments, a device includes one or more processors and memory storing instructions, the instructions, when executed by the one or more processors, cause the processors to perform the operations of the methods described herein. In some embodiments, a non-transitory computer readable storage medium storing instructions, which, when executed by a device with one or more processors, cause the device to perform the operations of the methods described herein.

Various advantages of the present application would be apparent in light of the descriptions below.

BRIEF DESCRIPTION OF THE DRAWINGS

In order to explain the embodiment of the present application more clearly, the description will be introduced with the following drawings. The drawings in the following description illustrate only some embodiments of the present application. For persons of ordinary skills in the art, they can also obtain other embodiments according to these drawings without any creative efforts.

Like reference numerals refer to corresponding parts throughout the several views of the drawings.

DESCRIPTION OF EMBODIMENTS

Reference will now be made to details of particular embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The embodiment of the present application provides a method and device for processing image data, which can be used to decrease the downloading burden of the users of mobile phone, advance the speed of loading sources of the program and reduce the memory consumption.

The method for processing image data of the embodiment of the present application is based on the method for processing image data of client device, for convenience of description, take the mobile phone terminal as an example of client device, but it does not limit to mobile phone terminal.

Figure 1:
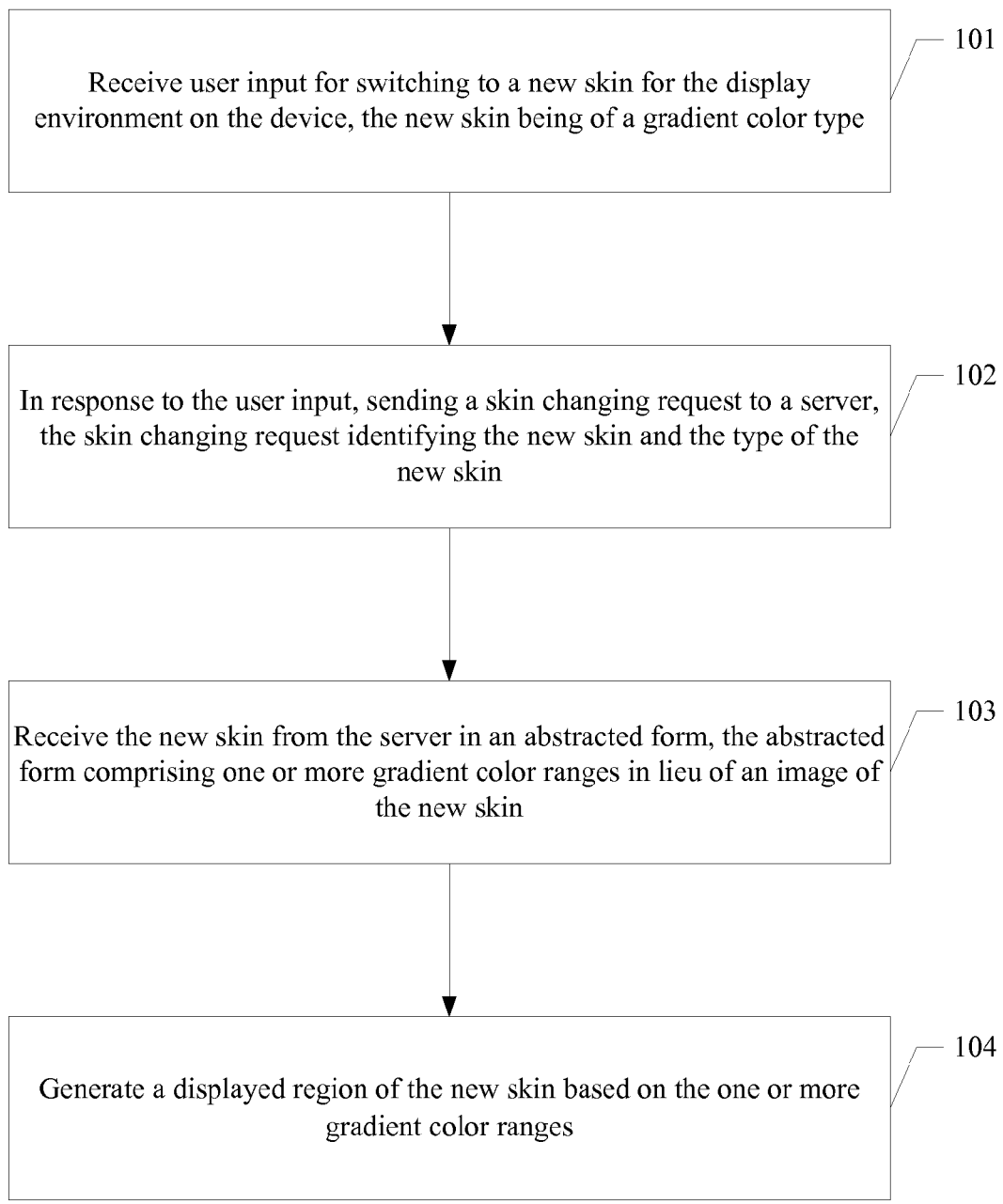
FIG. 1 is the schematic diagram of a method for applying a new skin to a display environment in accordance with some embodiments.

In FIG. 1, an exemplary method of processing image data (e.g., applying a new skin to a display environment) in accordance with some embodiments.

As shown in FIG. 1, a device (e.g., a client device) having one or more processors, memory, and a display, receives (101) user input for switching to a new skin for the display environment on the device, the new skin being of a gradient color type. In some embodiments, in response to the user input, the client device sends (102) a skin changing request to a server, the skin changing request identifying the new skin and the type of the new skin. For example, in some embodiments, when the user selects a new skin for a display environment using a skin selection interface of the device, the device determines whether the new skin is of the gradient color type. In general, a new skin of the gradient color type have gradually changing color attributes along one or more predetermined directions (e.g., the vertical direction, the horizontal direction, one or more diagonal directions, radiating from a center point or central axis along particular directions, etc.). In some embodiments, the color attribute includes one or more of a color saturation value, a brightness value, an RGB value, a beta value, etc. In some embodiments, the respective color attribute value for each pixel of a skin of the gradient color type can be generated in accordance with a smooth function (e.g., a linear function, or a quadratic function, etc.) with the pixel position as variables. In some embodiments, the client device is a mobile device such as a mobile telephone, a cellular phone, a tablet device, personal digital assistant (PDA), a desktop computer, etc., that connects with a server to obtain the selected new skin.

In some embodiments, in accordance with a determination that the new skin is of the gradient color type, the device generates a skin changing request for the gradient color type, where the skin changing request for the gradient color type includes an indicator that causes the server to provide the abstract form of the new skin in lieu of the image of the new skin. In some embodiments, the indicator is a flag bit that is set to 1 in the skin changing request if the selected new skin is a gradient color skin, and set to 0 in the skin changing request if the selected new skin is not a gradient color skin. In some embodiments, the server already possesses the respective skin type (e.g., gradient color skin and other types of skin) for each skin it offers. In some embodiments, the indicator merely indicates to the server that the client device prefers the new skin to be provided in an abstract form in lieu of the whole image, if the skin type of the new skin is the gradient color type.

For example, in some embodiments, the client device detects that the user has selected a thumbnail of a new skin presented in a skin changing user interface, the client device generates a skin changing request to download the selected skin from a server. If the user has selected a non-gradient color skin, the client device requests and downloads the whole skin as a single image. If, however, the client device determines that the user has selected a gradient color skin, the client device requests and downloads an abstracted form of the selected skin (e.g., by setting the indicator to 1), rather than downloading the whole image. In some embodiments, the abstracted form of the selected skin is smaller in size than the whole skin image. In some embodiments, the abstracted form of the selected skin includes instructions or a formula for determining the pixel color attribute of the selected skin for each pixel. In some embodiments, the abstracted form of the selected skin includes a color attribute range for the skin. For example, the abstracted form of the selected skin optionally includes a maximum RGB value and a minimum RGB value and a direction along which the RGB value will gradually change. The abstracted form of the selected skin allows the client device to be able to generate the whole skin locally, thus reducing network transmission size.

In some embodiments, the client device may be connected to a network via a WiFi connection (e.g., as opposed to a cellular network data connection, or network roaming connection), and the transmission size of the new skin may not be subject to any constraints. Therefore, in some embodiments, even if the selected new skin type is of the gradient color type, the client device optionally chooses to request and download the new skin as an image. As a result, the data processing burden on the client device (e.g., for generating the new skin image from the abstract form). In some embodiments, the client device determines whether a current type of network connection available to the device is a restricted usage connection (e.g., a connection that requires cellular data usage, or roaming charge, etc.), wherein generating the skin changing request for the gradient color type is further in accordance with a determination that the current type of network connection is a restricted usage connection.

In some embodiments, loading the entire skin image into memory and then applying the entire image to the display environment uses up a lot of memory. In some embodiments, the client device optionally chooses to download the gradient color skin in its abstract form, and calculates and applies each pixel of the new skin to the display environment based on the abstract form. In some embodiments, the calculation and application of the new skin is performed by the low level drawing functions, and does not require loading the entire image of the new skin into memory. In some embodiments, the client device determines whether current available memory size on the device is below a predetermined minimum value, wherein generating the skin changing request for the gradient color type is further in accordance with a determination that the current available memory size on the device is below the predetermined minimum value.

As shown in FIG. 1, the client device receives (103) the new skin from the server in the abstracted form, the abstracted form comprising one or more gradient color ranges in lieu of an image of the new skin. In some embodiments, the client device generates (104) a displayed region of the new skin based on the one or more gradient color ranges. For example, in some embodiments, the abstracted form of the new skin includes a maximum gradient color value and a minimum gradient color value along a respective gradient axis. When generating the displayed region of the new skin based on the one or more gradient color ranges, the client device determines a display area on the display for applying the new skin, and generates a respective color value for each pixel in the display area in accordance with the one or more gradient color ranges and a size of the display area. For example, if the gradient color skin has an RGB value range from (RGB value 1 to RGB value 2) in the vertical direction, the client device calculates the RGB value for each pixel according to its position along the vertical direction.

In some embodiments, when generating the displayed region of the new skin based on the one or more gradient color ranges, the client device determines one or more portions of the display on which the new skin will be visible to a user; and generates a respective color value for each pixel in each of the one or more portions in accordance with the one or more gradient color ranges, and respective size and location of the portion. For example, in some embodiments, the client device does not load and apply the new skin to the display environment as a whole image. Instead, the client device employs the low level drawing capabilities of the client device operating system, to determine the pixel value of each pixel where the new skin will be visible to the user. For example, if the new skin is to be applied to the desktop of the client device, and there are a number of icons on the desktop obscuring portions of the desktop, the client device determines the portions of the desktop that are visible to the user, and applies the new skin to the visible portions by calculating the pixel values of these portions and applying the pixel values using the basic drawing functions of the client device operating system.

Figure 2:
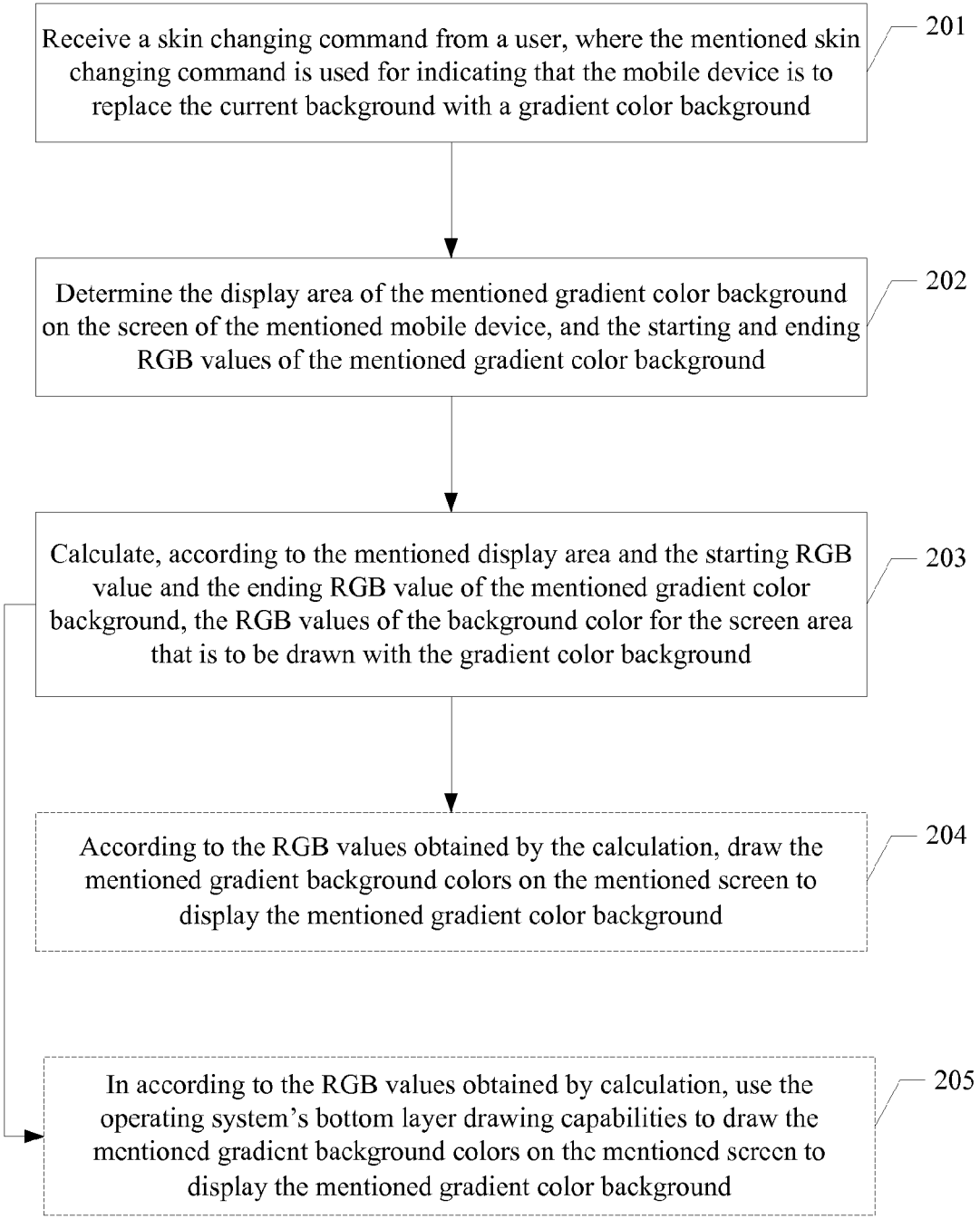
FIG. 2 is the schematic diagram of a method for processing image data in accordance with some embodiments.

FIG. 2 illustrate an embodiment of the method for processing image data (e.g., applying a new skin) in accordance with some embodiments.

Step 201, the client device receives a skin changing command from a user, where the mentioned skin changing command is used for indicating that the client device is to replace the current background with a gradient color background.

In some embodiments, the current background can be a gradient color background or a solid color background, and the changed background can also be a gradient color background or a solid color background. Since the realization mode of replacing a solid color background with another solid color background is simple, the following description uses the gradient color background as an example.

Step 202, the client device determines the display area of the mentioned gradient color background on the screen of the mentioned client device, and the starting and ending RGB values of the mentioned gradient color background.

In some embodiments, the client device detects the size of the current application interface to determine the display area of the gradient color background of the current application interface on the screen of the mentioned client device.

The RGB (red, green, blue) color model is a color standard used in the technology community, which obtains many kinds of colors by changing the three color channels of red (R), green (G) and blue (B) and overlaying the values in the three different channels. The RGB model used in the RGB color mode allocates an intensity level within a scope of 0-255 to each RGB component of each pixel in the background image. An RGB image can use only three color channels and mix them using different proportions to reproduce 16777216 different colors on the screen.

The client device determines the starting and the ending RGB values of the color gradation of the new background.

Step 203, the client device calculates, according to the mentioned display area and the starting RGB value and the ending RGB value of the mentioned gradient color background, the RGB values of the background color for the screen area that is to be drawn with the gradient color background.

In some embodiments, the client device calculates, according to the size of the mentioned display area and the starting RGB value and the ending RGB value of the mentioned gradient color background, the RGB value of the background color of the screen area to be drawn with the gradient color background.

Step 204, according to the RGB values obtained by the calculation, the client device draws the mentioned gradient background colors on the mentioned screen to display the mentioned gradient color background.

In some embodiments, the client device draws the colors of the mentioned gradient color background on the mentioned screen to display the mentioned gradient color background on the screen, and the skin changing operation is completed.

In some embodiments, the client device determines the display area of the gradient color background to be changed to on the screen by the user, determines the starting RGB value and the ending RGB value of the mentioned gradient background colors, and calculates according to the mentioned display area and the starting RGB value and the ending RGB value of the mentioned gradient background colors to obtain the RGB values of the mentioned gradient background colors. After that, the client device draws the colors of the mentioned gradient color background on the mentioned screen according to the RGB values obtained by calculation to display the mentioned gradient color background. Because only the RGB values are changed during the changing of the skin, local image sources are not used, this can decrease the downloading burden of the user of client device, advance the speed of loading resources of the program, and reduce memory usage.

Step 204 is used in some embodiments. FIG. 2 illustrates another embodiment of the method for processing image data which include steps 201-203, and another step 205.

Step 201, the client device receives a skin changing command from a user, where the mentioned skin changing command is used for indicating that the client device is to replace the current background with a gradient color background.

In some embodiments, the current background can be a gradient color background or a solid color background, and the changed background can also be a gradient color background or a solid color background. Since the realization mode of replacing a solid color background with another solid color background is simple, the following description uses the gradient color background as an example.

Step 202, the client device determines the display area of the mentioned gradient color background on the screen of the mentioned client device, and the starting and ending RGB values of the mentioned gradient color background.

In some embodiments, the client device detects the size of the current application interface to determine the display area of the gradient color background of the current application interface on the screen of the mentioned client device.

The RGB (red, green, blue) color model is a color standard used in the technology community, which obtains many kinds of colors by changing the three color channels of red (R), green (G) and blue (B) and overlaying the values in the three different channels. The RGB model used in the RGB color mode allocates an intensity level within a scope of 0-255 to each RGB component of each pixel in the background image. An RGB image can use only three color channels and mix them using different proportions to reproduce 16777216 different colors on the screen.

The client device determines the starting and the ending RGB values of the color gradation of the new background.

Step 203, the client device calculates, according to the mentioned display area and the starting RGB value and the ending RGB value of the mentioned gradient color background, the RGB values of the background color for the screen area that is to be drawn with the gradient color background.

In some embodiments, the client device calculates, according to the size of the mentioned display area and the starting RGB value and the ending RGB value of the mentioned gradient color background, the RGB value of the background color of the screen area to be drawn with the gradient color background. In some embodiments, the client device obtains the RGB values by calculating for the background colors of the screen area needing to be drawn and arrange them according to pixel lines or pixel rows, and then taking these RGB values as the drawing parameters of the bottom layer interface (e.g., the basic drawing functions) of the operating system.

For example, if the display area of the gradient color background is 30*20 pixels, i.e., 30 rows and 20 lines of pixels.

In a first example scenario: if the color background is a single solid color, that is, the given starting and ending RGB values are the same, then, the obtained RGB values by calculation are the same in the whole area required to be drawn.

In a second example scenario, if the color background is a color gradient displayed vertically according to the rows, then, the obtained RGB values are 30 rows of RGB values, each row having a respective color between the starting and the ending RGB values.

In a third example scenario, if the color background is a color gradient displayed horizontally according to the lines, then, the obtained RGB values are 20 lines of RGB values, each line having a respective color between the starting and the ending RGB values.

Other example color gradient having more than one axis along which the RGB values change gradually are possible. In addition, directions of the axis can be other than just vertical or horizontal. In some embodiments, the color background can have more than one sections (e.g., four quadrants) and each section has its own color gradient specifications (e.g., RGB value ranges, and directions of gradients, etc.).

Step 205, in according to the RGB values obtained by calculation, the client device uses the operating system's bottom layer drawing capabilities to draw the mentioned gradient background colors on the mentioned screen to display the mentioned gradient color background.

According to the calculated RGB values of the background colors of the screen area to be drawn, the client device uses the system's bottom layer drawing mode to draw the mentioned gradient background colors on the mentioned screen to display the mentioned gradient color background on the screen, and the skin changing operating is completed.

In general, the bottom layer drawing modes may be different according to the different device types. The device producers often provide various kinds of interfaces for drawing directly on the screen or the buffer area of screen. In some embodiments, the parameters of these interfaces may include the color value of a certain pixel point, color values of the pixel points of a whole row or a whole line, or even the original image data of the whole background image. In some embodiments, the system's bottom layer drawing mode used by the present application calls the RGB values needed by the bottom layer interface as parameters, the RGB values to be drawn is obtained by calculation instead of by decompression after loading the local picture into memory, which omits the image loading process from the skin changing operation.

In some embodiments, the client device determines the display area of the gradient color background to be changed to on the screen by the user, determines the starting RGB value and the ending RGB value of the mentioned gradient background colors, and calculates according to the mentioned display area and the starting RGB value and the ending RGB value of the mentioned gradient background colors to obtain the RGB values of the mentioned gradient background colors line by line and/or row by row. After that, the client device draws the colors of the mentioned gradient color background on the mentioned screen according to the RGB values obtained by calculation using the system's bottom layer drawing capabilities to display the mentioned gradient color background. Because only the RGB values are changed during the changing of the skin, local image sources are not used, this can decrease the downloading burden of the user of client device, advance the speed of loading resources of the program, and reduce memory usage.

Figure 3:
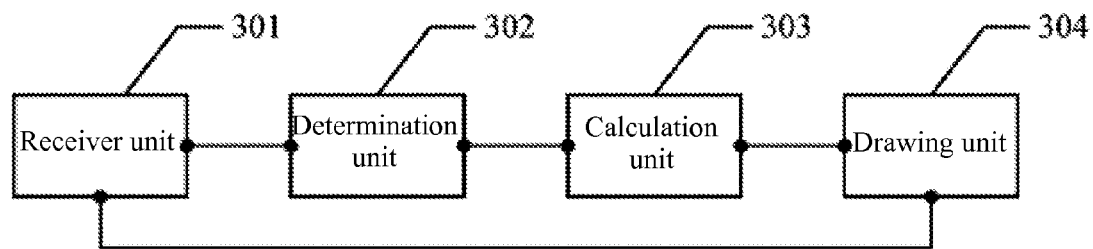
FIG. 3 is the schematic diagram of the device for processing image data in accordance with some embodiments.

FIG. 3 illustrates an embodiment of the client device for processing image data (e.g., applying a new skin to a display environment). The device includes:

Receiver unit 301, configured to receive the skin changing command of users, the mentioned skin changing command is used for indicating that the client device is to replace the current background with a gradient color background.

Determination units 302, configure to determine the display area of the mentioned gradient color background on the screen of the mentioned client device.

Mentioned determination unit 302, also configure to determine the starting RGB value and ending RGB value of the mentioned gradient background color;

Calculation unit 303, configured to calculate according to the mentioned display area and the starting RGB value and the ending RGB value of the mentioned gradient color background to obtain the RGB values of the mentioned gradient color background.

Drawing unit 304, configured to draw the colors of the mentioned gradient color background on the mentioned screen to display the mentioned gradient color background according to the RGB values obtained by calculation.

More details of the client device are described in other parts of this disclosure, e.g., in FIGS. 1-2, and 4-5, and accompanying descriptions.

In the embodiment of the present application, according to the skin changing command of users, the determination unit 302 determines the display area of the gradient color background the user wishes to switch to on the screen, and determines the starting RGB value and the ending RGB value of the mentioned gradient color background color. The calculation unit 303 calculates according to the mentioned display area and the starting RGB value and the ending RGB value of the mentioned gradient color background to obtain the RGB values of the mentioned gradient color background row by row and/or line by line. After that, the drawing unit 304 draws the colors of the mentioned gradient color background on the mentioned screen according to the RGB values obtained by calculation to display the mentioned gradient color background. Because only the RGB values are changed during the skin changing operation, local picture sources are not used, decreasing the downloading burden of the user of client device, advancing the speed of loading resources of the program and reducing memory usage.

Figure 4:
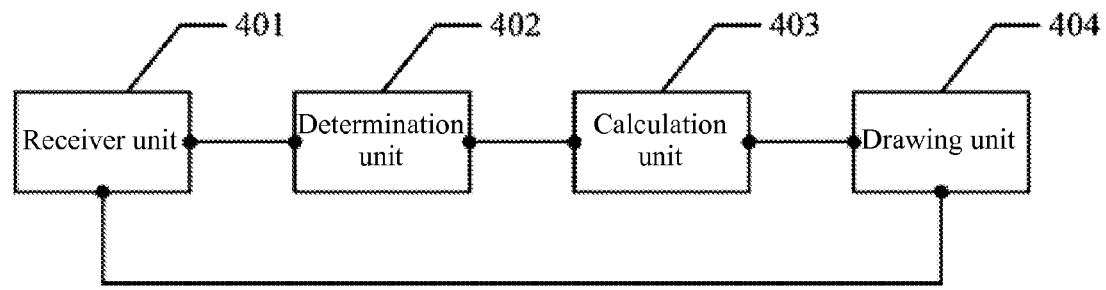
FIG. 4 is the schematic diagram of the device for processing image data in accordance with some embodiments.

FIG. 4 illustrates another embodiment of the device for processing image data (e.g., applying a new skin to a display environment). The device includes:

Receiver unit 401, configured to receive the skin changing command of a user, the mentioned skin changing command is used for indicating that the client device is to replace the current background with a gradient color background.

Determination units 402, configure to determine the display area of the mentioned gradient color background on the screen of the mentioned client device.

Mentioned determination unit 402, also configure to determine the starting RGB value and the ending RGB value of the mentioned gradient color background.

Calculation unit 403, configured to calculate according to the mentioned display area and the starting RGB value and the ending RGB value of the mentioned gradient color background to obtain the RGB values of the mentioned gradient color background line by line or row by row.

Drawing unit 404, configured to draw the mentioned gradient color background on the mentioned screen to display the mentioned gradient color background according to the RGB values obtained by calculation.

Further, mentioned calculation unit 403 is also configured to calculate by the mode of color gradation line by line or row by row according to the mentioned display area and the starting RGB value and the ending RGB value of the mentioned gradient color background to obtain the RGB values of the mentioned gradient color background.

Further, the mentioned drawing unit 404 is also configured to draw the mentioned gradient color background on the mentioned screen to display the mentioned gradient color background with the system's bottom layer drawing capabilities according to the RGB values obtained by calculation.

More details of the client device are described in other parts of this disclosure, e.g., in FIGS. 1-3 and 5 and accompanying descriptions.

In the embodiment of the present application, according to the skin changing command of the user, the determination unit 402 determines the display area of the gradient color background the user wishes to use on the screen, and determines the starting RGB value and the ending RGB value of the mentioned gradient color background. The calculation unit 403 calculates according to the mentioned display area and the starting RGB value and the ending RGB value of the mentioned gradient color background, calculates by the mode of color gradation line by line or row by row to obtain the RGB values of the mentioned gradient color background. After that, the drawing unit 404 uses the system's bottom layer drawing capabilities to draws the colors of the mentioned gradient color background on the mentioned screen according to the RGB values obtained by calculation to display the mentioned gradient color background. Because only the RGC values are changed during the skin changing operation, the local picture sources are not used, decreasing the downloading burden of the user of client device, advancing the speed of loading resources of the program and reducing memory usage.

Figure 5:
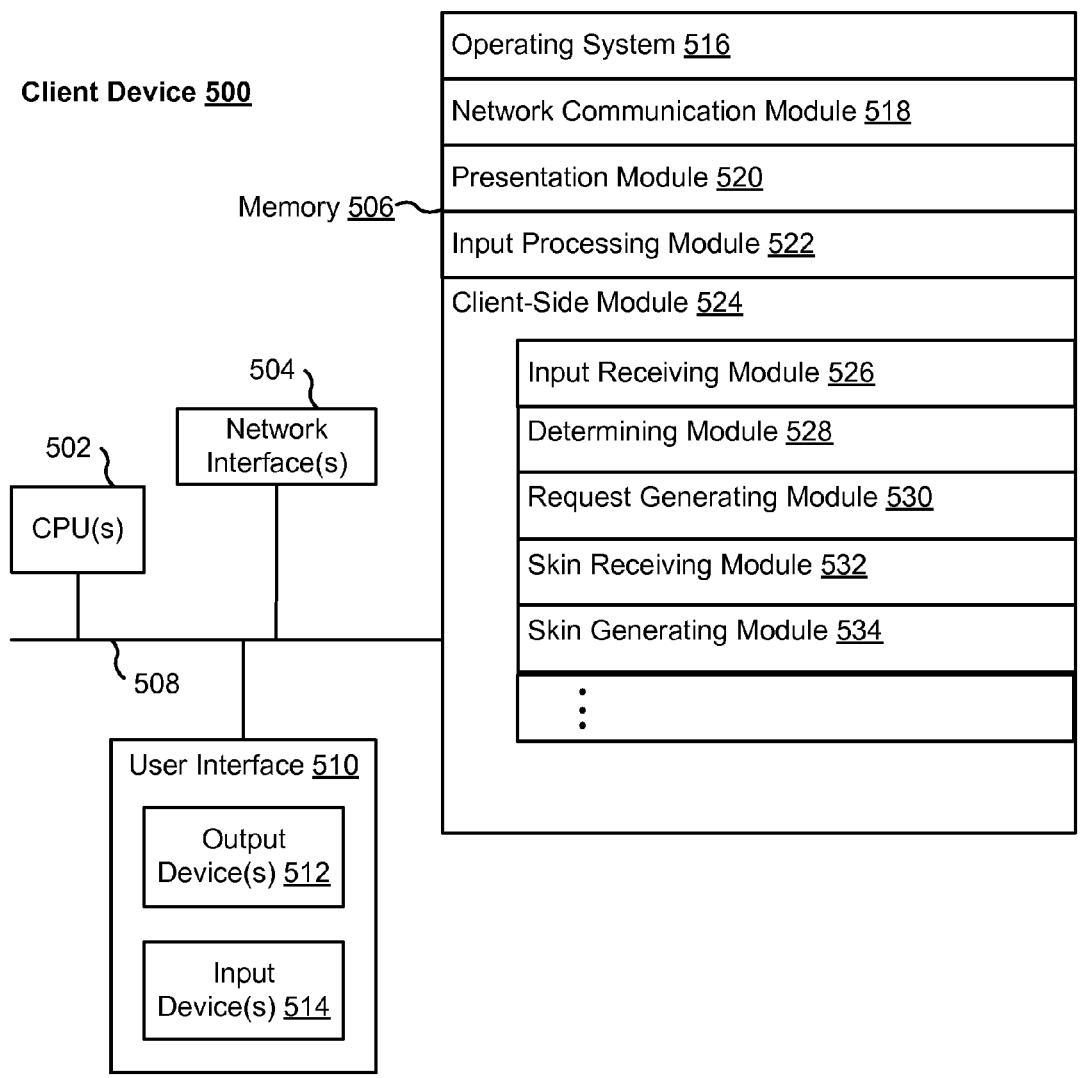
FIG. 5 is a block diagram illustrating a system for applying a new skin to a display environment in accordance with some embodiments.

FIG. 5 is a block diagram illustrating a representative client device 500 associated with a user in accordance with some embodiments. The client device 500 performs the methods described herein in accordance with various embodiments of the present application. Client device 500 includes one or more processing units (CPUs) 502, one or more network interfaces 504, memory 506, and one or more communication buses 508 for interconnecting these components (sometimes called a chipset).

Client device 500 also includes a user interface 510. User interface 510 includes one or more output devices 512 that enable presentation of media content, including one or more speakers and/or one or more visual displays. User interface 510 also includes one or more input devices 514, including user interface components that facilitate user input such as a keyboard, a mouse, a voice-command input unit or microphone, a touch-screen display, a touch-sensitive input pad, a gesture capturing camera, or other input buttons or controls. Furthermore, some client devices 500 use a microphone and voice recognition or a camera and gesture recognition to supplement or replace the keyboard.

Memory 506 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 806, optionally, includes one or more storage devices remotely located from CPU(s) 802. Memory 806, or alternately the non-volatile memory device(s) within memory 806, includes a non-transitory computer readable storage medium. In some implementations, memory 806, or the non-transitory computer readable storage medium of memory 806, stores the following programs, modules, and data structures, or a subset or superset thereof:

- an operating system 516 including procedures for handling various basic system services and for performing hardware dependent tasks. As described in this specification, the operating system includes the bottom layer drawing capabilities (e.g., drawing the pixels based on pixel values on the screen);
- a network communication module 518 for connecting client device 500 to other computing devices (e.g., a server system providing the new skins or the abstract form thereof) connected to one or more networks via one or more network interfaces 504 (wired or wireless);
- a presentation module 520 for enabling presentation of information (e.g., a user interface for a web page or an application program, a game, audio and/or video content, text, etc.) at client device 500 via one or more output devices 512 (e.g., displays, speakers, etc.) associated with user interface 510; and
- an input processing module 522 for detecting one or more user inputs or interactions from one of the one or more input devices 514 and interpreting the detected input or interaction.

In some embodiments, memory 506 also includes a client-side module 524 for performing image data processing as described in this disclosure. Client-side module 524 includes, but is not limited to:

- input receiving module 526 for receiving the user input for switching to a new skin for the display environment;
- determining module 528 for determining whether the new skin is of the gradient color type. The determining module 528 optionally also determines whether a current type of network connection available to the device is a restricted usage connection, and/or whether current available memory size on the device is below a predetermined minimum value;
- request generating module 530 for generating the skin changing request for the gradient color type in accordance with a determination that the new skin is of the gradient color type, where the skin changing request for the gradient color type includes an indicator that causes the server to provide the abstract form of the new skin in lieu of the image of the new skin. In some embodiments, the skin changing request is generated further in accordance with a determination that the current type of network connection is a restricted usage connection and/or a determination that the current available memory size on the device is below the predetermined minimum value;
- skin receiving module 532 for the new skin from the server in an abstracted form, the abstracted form comprising one or more gradient color ranges in lieu of an image of the new skin; and
- skin generating module 534 for generating a displayed region of the new skin based on the one or more gradient color ranges. In some embodiments, the skin generation module 534 determines a display area on the display for applying the new skin, and generates a respective color value for each pixel in the display area in accordance with the one or more gradient color ranges and a size of the display area. In some embodiments, the skin generation module 534 determines one or more portions of the display on which the new skin will be visible to a user, and generates a respective color value for each pixel in each of the one or more portions in accordance with the one or more gradient color ranges, and respective size and location of the portion.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above. Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of applying a new skin to a display environment, comprising:
    at a client device having one or more processors, memory, and a display:
        receiving a user input for switching to a new skin for the display environment on the client device, the new skin being of a gradient color type;
        in response to receiving the user input for switching to the new skin of the gradient color type:
            determining whether a current type of network connection available to the client device is a restricted usage connection, wherein the restricted usage connection is restricted by one of potential usage charges or data usage limits;
            in accordance with a determination that the current type of network connection is a restricted usage connection:
                generating a first skin changing request for the gradient color type to receive the new skin in an abstracted form in lieu of an image of the new skin;
                sending the first skin changing request to a server;
                receiving the new skin from the server in the abstracted form, wherein the abstracted form of the new skin comprises one or more gradient color ranges in lieu of the image of the new skin and wherein the abstracted form of the new skin includes a maximum gradient color value and a minimum gradient color value along a respective gradient axis; and
            generating a displayed region of the new skin based on the one or more gradient color ranges.

2. The method of claim 1, wherein the first skin changing request for the gradient color type includes an indicator that causes the server to provide the abstract form of the new skin in lieu of the image of the new skin.

3. The method of claim 1, further comprising:
    in response to receiving the user input for switching to the new skin of the gradient color type:
        in accordance with a determination that the current type of network connection is not a restricted usage connection, generating a second skin changing request to receive the new skin as an image of the new skin.

4. The method of claim 1, further comprising:
    determining whether current available memory size on the device is below a predetermined minimum value, wherein generating the first skin changing request for the gradient color type is further in accordance with a determination that the current available memory size on the device is below the predetermined minimum value.

5. The method of claim 1, wherein generating the displayed region of the new skin based on the one or more gradient color ranges further comprises:
    determining a display area on the display for applying the new skin; and
    generating a respective color value for each pixel in the display area in accordance with the one or more gradient color ranges and a size of the display area.

6. The method of claim 1, wherein generating the displayed region of the new skin based on the one or more gradient color ranges further comprises:
    determining one or more portions of the display on which the new skin will be visible to a user; and
    generating a respective color value for each pixel in each of the one or more portions in accordance with the one or more gradient color ranges, and respective size and location of the portion.

7. A client system for applying a new skin to a display environment, comprising:
    one or more processors;
    a display; and
    memory having instructions stored thereon, the instructions, when executed by the one or more processors, cause the processors to perform operations comprising:
        receiving a user input for switching to a new skin for the display environment on the client system, the new skin being of a gradient color type;
        in response to receiving the user input for switching to the new skin of the gradient color type:
            determining whether a current type of network connection available to the client device is a restricted usage connection, wherein the restricted usage connection is restricted by one of potential usage charges or data usage limits;
            in accordance with a determination that the current type of network connection is a restricted usage connection:

generating a first skin changing request for the gradient color type to receive the new skin in an abstracted form in lieu of an image of the new skin;

sending the first skin changing request to a server;

receiving the new skin from the server in the abstracted form, wherein the abstracted form of the new skin comprises one or more gradient color ranges in lieu of the image of the new skin and wherein the abstracted form of the new skin includes a maximum gradient color value and a minimum gradient color value along a respective gradient axis; and generating a displayed region of the new skin based on the one or more gradient color ranges.

8. The client system of claim 7, wherein the first skin changing request for the gradient color type includes an indicator that causes the server to provide the abstract form of the new skin in lieu of the image of the new skin.

9. The client system of claim 7, wherein the operations further comprise:

in response to receiving the user input for switching to the new skin of the gradient color type:

in accordance with a determination that the current type of network connection is not a restricted usage connection, generating a second skin changing request to receive the new skin as an image of the new skin.

10. The client system of claim 7, wherein the operations further comprise:

determining whether current available memory size on the device is below a predetermined minimum value, wherein generating the first skin changing request for the gradient color type is further in accordance with a determination that the current available memory size on the device is below the predetermined minimum value.

11. The client system of claim 7, wherein generating the displayed region of the new skin based on the one or more gradient color ranges further comprises:

determining a display area on the display for applying the new skin; and generating a respective color value for each pixel in the display area in accordance with the one or more gradient color ranges and a size of the display area.

12. The client system of claim 7, wherein generating the displayed region of the new skin based on the one or more gradient color ranges further comprises:

determining one or more portions of the display on which the new skin will be visible to a user; and generating a respective color value for each pixel in each of the one or more portions in accordance with the one or more gradient color ranges, and respective size and location of the portion.

13. A non-transitory computer-readable medium for applying a new skin to a display environment of a client device, the computer-readable medium having instructions stored thereon, the instructions, when executed by one or more processors, cause the processors to perform operations comprising:

receiving a user input for switching to a new skin for the display environment on the client device, the new skin being of a gradient color type;

in response to receiving the user input for switching to the new skin of the gradient color type:

determining whether a current type of network connection available to the client device is a restricted usage connection, wherein the restricted usage connection is restricted by one of potential usage charges or data usage limits;

in accordance with a determination that the current type of network connection is a restricted usage connection:

generating a first skin changing request for the gradient color type to receive the new skin in an abstracted form in lieu of an image of the new skin;

sending the first skin changing request to a server;

receiving the new skin from the server in the abstracted form, wherein the abstracted form of the new skin comprises one or more gradient color ranges in lieu of the image of the new skin and wherein the abstracted form of the new skin includes a maximum gradient color value and a minimum gradient color value along a respective gradient axis; and generating a displayed region of the new skin based on the one or more gradient color ranges.

14. The computer-readable medium of claim 13, wherein the first skin changing request for the gradient color type includes an indicator that causes the server to provide the abstract form of the new skin in lieu of the image of the new skin.

15. The computer-readable medium of claim 13, wherein the operations further comprise:

in response to receiving the user input for switching to the new skin of the gradient color type:

in accordance with a determination that the current type of network connection is not a restricted usage connection, generating a second skin changing request to receive the new skin as an image of the new skin.

16. The computer-readable medium of claim 13, wherein the operations further comprise:

determining whether current available memory size on the device is below a predetermined minimum value, wherein generating the first skin changing request for the gradient color type is further in accordance with a determination that the current available memory size on the device is below the predetermined minimum value.

17. The computer-readable medium of claim 13, wherein generating the displayed region of the new skin based on the one or more gradient color ranges further comprises:

determining a display area on the display for applying the new skin; and generating a respective color value for each pixel in the display area in accordance with the one or more gradient color ranges and a size of the display area.

* * * * *